United States Patent Office 3,431,223
Patented Mar. 4, 1969

3,431,223
PARTIAL ESTERS AS POLYOLS FOR
POLYURETHANE FOAMS
Harold E. Reymore, Jr., Wallingford, and Adnan A. R. Sayigh, North Haven, Conn., assignors to The Upjohn Company, Kalamazoo, Mich., a corporation of Delaware
No Drawing. Filed June 10, 1966, Ser. No. 556,559
U.S. Cl. 260—2.5                                  6 Claims
Int. Cl. C08g 22/44, 22/18

ABSTRACT OF THE DISCLOSURE

Novel polyols and polyurethane foams, derived therefrom by reaction with polymethylene polyphenyl isocyanates under foam producing conditions, are described. The novel polyols are the half esters derived by reacting a polycarboxylic acid intramolecular anhydride with a polyol of equivalent weight of 70 to 200 and average functionality of 2 to 8. The resulting polyols contain 1 free carboxyl group for each anhydride moiety in the starting materials. The polyurethane foams derived from these polyols by reaction with the above isocyanate are characterized by resistance to deformation on prolonged exposure to temperatures of 250° C. or higher.

---

This invention relates to novel polyols and to polyurethanes prepared therefrom and is more particularly concerned with novel polyols which contain free carboxyl groups and with novel high temperature resistant cellular polyurethanes prepared therefrom, and with processes for the preparation of said polyols and said polyurethanes.

Rigid cellular polyurethanes are now widely used as thermal insulating materials and thermal barriers in a variety of industries and for a variety of purposes. Recent advances in this art have provided foams having a wide range of properties custom tailored for any particular desired use. However, none of the rigid polyurethane foams so far made available will retain its original thermal insulating properties and structural integrity on exposure to temperatures of the order of about 250° C. Thus the rigid polyurethane foams so far known rapidly lose weight, due to volatilization and decomposition, on heating to temperatures at or approaching 250° C. Said loss of weight and structural integrity results in a corresponding loss of thermal insulating and the like properties. It is highly desirable, particularly where the intended use is as a thermal barrier such as a fire wall designed to reduce or prevent the spread of fire in buildings and the like, to provide rigid cellular polyurethanes which will maintain their structural integrity at much higher temperatures than is presently possible.

The present invention provides a means of producing rigid cellular polyurethanes which retain their structural integrity to a much greater degree than hitherto possible on prolonged exposure to temperatures of 250° C. and higher. These novel products will be referred to herein as "high temperature resistant foams." The present invention also provides a novel class of free carboxyl containing polyols which can be used in the preparation of said high temperature resistant foams.

The novel polyols of the invention are free carboxy group containing polyols which comprise the half ester (I) obtained by reacting a polycarboxylic acid intramolecular anhydride and a polyol having an equivalent weight of about 70 to about 200 and an average functionality of from about 2 to about 8, the polyol being used in a proportion of approximately 1 mole for each anhydride moiety in the polycarboxylic acid intramolecular anhydride.

The term "polycarboxylic acid intramolecular anhydride" refers to a well-recognized group of compounds which are anhydrides derived from polycarboxylic acids in which at least two of the carboxylic acid groups are attached to adjacent carbon atoms. Said anhydrides include those derived from aromatic, aliphatic, cycloaliphatic, araliphatic, and heterocyclic polycarboxylic acids which have at least two carboxylic acid groups attached to adjacent carbon atoms. Examples of polycarboxylic acid intramolecular anhydrides are:

trimellitic anhydride,
phthalic anhydride,
pyromellitic dianhydride,
benzene-1,2,3,4-tetracarboxylic dianhydride,
tetrahydrophthalic anhydride,
tetrabromophthalic anhydride,
diphenyl-3,3',4,4'-tetracarboxylic dianhydride,
diphenyl-2,2',3,3'-tetracarboxylic dianhydride,
naphthalene-2,3,6,7-tetracarboxylic dianhydride,
naphthalene-1,2,5,6-tetracarboxylicdianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic
  dianhydride,
4,8-dimethyl-1,2,3,5,6,7-hexahydronaphthalene-1,2,5,6-
  tetracarboxylic dianhydride,
2,6-dichloronaphthalene-1,4,5,8-tetracarboxylic
  dianhydride,
2,7-dichloronaphthalene-1,4,5,8-tetracarboxylic
  dianhydride,
2,3,6,7-tetrachloronaphthalene-1,4,5,8-tetracarboxylic
  dianhydride,
phenanthrene-1,3,9,10-tetracarboxylic dianhydride,
perylene-3,4,9,10-tetracarboxylic dianhydride,
bis(2,3-dicarboxyphenyl)methane dianhydride,
bis(3,4-dicarboxyphenyl)methane dianhydride,
bis(2,3-dicarboxyphenyl)methane dianhydride,
1,1-bis(3,4-dicarboxyphenyl)ethane dianhydride,
2,2-bis(2,3-dicarboxyphenyl)propane dianhydride,
2,2-bis(3,4-dicarboxyphenyl)propane dianhydride,
bis(3,4-dicarboxyphenyl)sulfone dianhydride,
bis)3,4-dicarboxyphenyl)ether dianhydride,
ethylene tetracarboxylic dianhydride,
butane-1,2,3,4-tetracarboxylic dianhydride,
cyclopentane-1,2,3,4-tetracarboxylic dianhydride,
pyrrolidine-2,3,4,5-tetracarboxylic dianhydride,
pyrazine-2,3,5,6-tetracarboxylic dianhydride,
thiophene-2,3,4,5-tetracarboxylic dianhydride,
4-oxabicyclo[2.2.1]-5-heptene-2,3-dicarboxylic
  anhydride, and
1,4,5,6,7,7-hexachlorobicyclo[2.2.1]hep-5-ene-2,3-
  dicarboxylic anhydride (chlorendic anhydride).

While any of the polycarboxylic acid intramolecular anhydrides defined and exemplified above can be employed in the preparation of the half-ester polyols (I) of the invention a preferred group of anhydrides for this purpose are those which are derived from polycarboxylic acids wherein at least two carboxyl groups are attached directly to an aromatic nucleus in ortho-position with respect to each other. A particularly preferred group of half-ester polyols of the invention are those derived by reacting a polyol having an equivalent weight of about 70 to 200, and a functionality from about 2 to about 8, in the proportions defined above, with a polycarboxylic acid intramolecular anhydride selected from the group consisting of anhydrides having the following formulae:

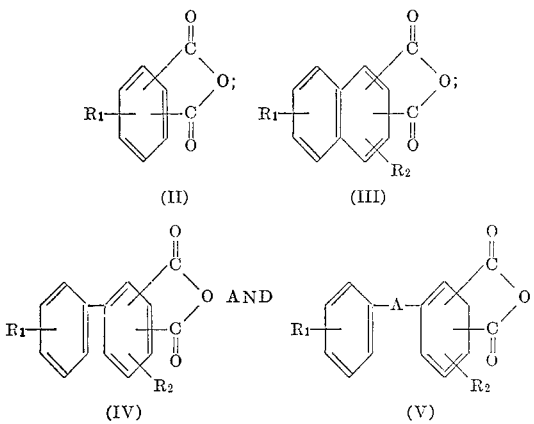

wherein the valencies of the anhydro group are attached to adjacent carbon atoms in the benzene nucleus and wherein $R_1$ and $R_2$ each represent from 0 to 3 substituents selected from the class consisting of carboxyl, halogen, lower-alkyl, and

wherein the carbon atoms of the latter are each attached to adjacent carbon atoms in an aromatic ring, and A is a bridging group selected from the class consisting of lower-alkylene, carbonyl, sulfonyl, and oxygen.

The term "lower-alkyl" means alkyl containing from 1 to 6 carbon atoms, inclusive, such as methyl, ethyl, propyl, butyl, pentyl, hexyl, and isomeric forms thereof. The term "halogen" means fluorine, chlorine, bromine and iodine. The term "lower-alkylene" means alkylene containing from 1 to 6 carbon atoms, inclusive, such as methylene, ethylene, 1,1-propylene, 1,2-propylene, 1,1-butylene, 2,2-butylene, 3,3-hexylene, and the like.

Any of the polyols conventionally employed in the art for the production of rigid polyurethane foams can be employed in the preparation of the half esters (I) of the invention. Preferably the polyols employed to prepare the half esters are those having an equivalent weight of about 70 to 200 and an average functionality of from about 2 to about 8.

Illustrative of the polyols which fall within the above definition are polyethers such as polyoxyalkylene glycols, for example, those obtained by the addition of one or more akylene oxides such as ethylene oxide, propylene oxide, and the like, to water, ethylene glycol, propylene glycol, diethylene glycol, dipropylene glycol and the like or mixtures thereof; polyether glycols prepared by reacting ethylene oxide, propylene oxide or mixtures thereof with mono- and poly- nuclear dihydroxy-benzenes such as catechol, resorcinol, hydroquinone, orcinol, 2,2-bis(p-hydroxyphenyl)propane, bis(p-hydroxyphenyl)methane, and the like; polyethers prepared by reacting ethylene oxide, propylene oxide, and the like alkylene oxides or mixtures thereof with aliphatic polyols such as glycerol, sorbitol, trimethylolpropane, 1,2,6-hexanetriol, pentaerythritol, sucrose, or glycosides such as the methyl, ethyl, propyl, butyl and 2-ethylhexyl derivatives of arabinose, xylose, fructose, glucose, rhamnose, and the like; and polyethers prepared by reacting ethylene oxide, propylene oxide and like alkylene oxides or mixtures thereof with alicyclic polyols such as tetramethylol cyclohexanol, trimethylol cyclohexanol, and the like, polyols containing a heterocyclic nucleus such as 3,3,5-tris(hydroxymethyl)-5-methyl-4-hydroxytetrahydropyran, 3,3,5,5 - tetrakis(hydroxymethyl)-4-hydroxytetrahydropyran, and the like, and polyhydric phenols such as 2,2-bis(hydroxyphenyl) ethanol, pyrogallol, phloroglucinol, poly(hydroxyphenyl)alkanes, for example, 1,1,3,-tris(hydroxyphenyl)ethanes, 1,1,3,3-tetrakis(hydroxy-3-methylphenyl)propanes, 1,1,4,4-tetrakis(hydroxyphenyl)butanes, and the like.

The polyols which can be employed in the preparation of the half-esters (I) of the invention also include the adducts of primary aromatic mono- and poly amines with alkylene oxides such as ethylene oxide, propylene oxide, and the like or mixtures thereof. Examples of primary amines from which such adducts can be prepared are aniline, toluidine, xylidine, benzidine, o-tolidine, o-, m-, and p-phenylenediamine, 2,4- and 2,6-diaminotoluene, 2,4,6-triaminotoluene, 3,4,5-triaminotoluene, 4,4'-methylenedianiline, 4,4'-ethylidenedianiline and the like, as well as polyamines prepared by interaction of aromatic primary amines such as aniline, o-toluidine, p-chloroaniline, p-bromoaniline and the like with formaldehyde and the like aldehydes in the presence of a mineral acid such as hydrochloric acid. Particularly useful polyols of the above type derived by reaction of alkylene oxides and polyamines are those comprising a polyol adduct produced by mixing under hydroxyalkylation conditions from 2 to 20 molecular equivalents of ethylene oxide, propylene oxide or 1,2-butylene oxide, or mixtures thereof, and one amine equivalent of a polyamine mixture, 100 parts of said polyamine mixture containing from 35 to 90 parts of methylenedianilines, the remaining parts being triamines and polyamines of higher molecular weight, said methylenedianilines, triamines, and polyamines of higher molecular weight having been formed by acid condensation of aniline and formaldehyde.

The polyols which can be employed in the preparation of the half esters (I) of the invention also include other N,N-di(hydroxyalkyl)amines such as o,o'-bis(diethanolaminomethyl) - p - nonylphenol, N,N,N',N' - tetra(2-hydroxypropyl)ethylenediamine, N,N,N',N' - tetra(2 - hydroxyethyl)ethylenediamine, and the like hydroxyalkylated aliphatic diamines.

The polyols which can be employed in the preparation of the half esters (I) of the invention also include polyester polyols. Illustrative polyester polyols are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Examples of such acids are phthalic acid, terephthalic acid, isophthalic acid, succinic acid, glutaric acid, adipic acid, pimelic acid and the like. Examples of polyhydric alcohols used to form the above polyesters are trimethylolpropane, trimethylolethane, mannitol, 1,2,6-hexanetriol, glycerol, pentaerythritol, and the like. Minor proportions of dihydric alcohols such as ethylene glycol, diethylene glycol, 1,2-propylene glycol, 1,4-butanediol and the like, can also be used in combination with trihydric and higher polyhydric alcohols in the preparation of the above polyesters.

The polyester polyols which can be employed in the preparation of the half esters (I) of the invention also include polyesters obtained by condensation of a lactone such as ε-caprolactone, ε-caprolactone substituted by one or more alkoxy, alkyl, aralkyl or cycloalkyl groups, and the like, with a glycol such as ethylene glycol, propylene glycol, and the like, a diamine such as ethylene diamine, 1,2-propylenediamine, and the like, or an alkanolamine such as ethanolamine, propanolamine, isopropanolamine, and the like, in accordance with procedures well known in the art, for examples those described in U.S. 2,914,556.

The polyols which can be employed in the preparation of the half esters (I) of the invention also include phosphorus containing polyols such as the dialkyl N,N-di(hydroxyalkyl)aminomethanephosphonates of which diethyl N,N - di(2 - hydroxyethyl)aminomethanephosphonate (Fyrol 6) is typical, and alkylene oxide-phosphoric acid adducts such as those described in U.S. Patent 2,372,244.

In preparing the half esters (I) of the invention the reactants, namely the polycarboxylic acid intramolecular anhydride and the polyol, are brought together in any convenient manner and the resulting mixture is heated. Advantageously the reaction mixture is heated at a temperature within the range of about 150° C. to about 250° C. and preferably within the range of about 180° C. to about 210° C. The heating is continued until the desired formation of half ester is complete, as determined by subjecting an aliquot to titration, or like conventional analytical procedures designed to estimate the amount of free carboxyl groups present in the mixture. When the reaction is complete the reaction mixture is cooled, or allowed to cool, to room temperature (circa 25° C.). If desired the product so obtained can be subjected to purification procedures to remove unchanged starting materials and the like. Such purification procedures include chromatography, countercurrent distribution and the like. A particularly convenient form of purification involves treating the product with an excess of aqueous sodium hydroxide to form a solution of the sodium salt of the desired half-ester (I), removing insoluble impurities by filtration, solvent extraction and the like, and then regenerating the desired half ester (I) from the aqueous solution by acidification using a mineral acid such as hydrochloric acid.

The proportions of polyol to polycarboxylic acid intramolecular anhydride employed in preparing the half-esters (I) of the invention are preferably such that there is approximately 1 molar proportion of polyol for each anhydride group in the polycarboxylic acid intramolecular anhydride. Higher proportions of polyol can be employed, if desired, but result merely in the production of a mixture of the desired half-ester (I) and unreacted polyol. Where the half-ester (I) is intended for use as an intermediate in the preparation of rigid polyurethane foams the production of a mixture of half ester (I) and unchanged polyol may be desirable, as will be discussed hereinafter. Where, however, the half-ester (I) is required in substantially pure form the production of a mixture of the half-ester (I) and unchanged polyol is undesirable in view of the purification procedures (discussed above) which are necessary to separate the components of the mixture.

The half-esters (I) of the invention contain at least 2 active hydrogen atoms, i.e. hydrogen atoms which are active in the test described by Zerewitinoff, J. Am. Chem. Soc. 49, 3181, 1927. Thus for each anhydride group originally present in the polycarboxylic acid intramolecular anhydride used to prepare the half-ester (I) there will be present in the latter one active hydrogen atom in the free carboxylic acid group formed from the anhydride group and $(n-1)$ active hydrogen atoms in the free hydroxy groups of the ester moiety corresponding to the polyol of functionality $n$ employed to make the half ester (I).

The novel rigid cellular polyurethanes of the invention are those which are obtained by reacting, under foam producing conditions, a polyol comprising a half ester (I) as hereinbefore defined and a polyisocyanate which comprises a mixture of polymethylene polyphenyl isocyanates containing from about 40 to about 65 percent by weight of methylenebis(phenyl isocyanates) the remainder of said mixture being polymethylene polyphenyl isocyanates having a functionality higher than 2.0.

Polymethylene polyphenyl isocyanates having the composition defined above are well-known in the art and are generally prepared in accordance with conventional techniques by phosgenation of the corresponding mixtures of methylene bridged polyphenyl polyamines. The latter are obtained by condensation of aniline and formaldehyde in the presence of aqueous mineral acid, usually hydrochloric acid, by procedures known in the art; see, for example, Canadian Patent 700,026, U.S. Patent 2,683,730, 2,950,263 and German specification 1,131,877.

The desired proportion of methyleneabis(phenyl isocyanate) in the polymethylene polyphenyl isocyanate is attained by controlling the proportion of methylenedianilines in the intermediate polyamine, and the latter proportion is, in turn, controlled by adjusting the ratio of aniline to formaldehyde in the initial condensation of these components. Thus, by using a molar proportion of aniline to formaldehyde of the order of about 4.0 to 1.75 in this condensation there is obtained a polyamine which on phosgenation gives the desired polymethylene polyphenyl isocyanate containing approximately 65% of methylenebis(phenyl isocyanate). By using a molar proportion of aniline to formaldehyde of the order of about 4.0 to about 2.55 in the above condensation there is obtained a polyamine which on phosgenation gives the desired polymethylene polyphenyl isocyanate containing approximately 40% of methylenebis(phenyl isocyanate). In order to produce polymethylene polyphenyl isocyanates with a content of methylenebis(phenyl isocyanate) intermediate between the above limits it is merely necessary to make the appropriate adjustment of the aniline to formaldehyde ratio used in preparing the intermediate polyamine.

The procedures adopted in the preparation of rigid cellular polyurethanes from the half-ester (I) and the polymethylene polyphenyl isocyanate differ according to the proportion of half-ester (I) employed in the polyol component. Thus when the half ester (I) is employed in admixture with other conventional polyols for example any of the known polyols set forth above as useful in the preparation of the half esters (I), such that the proportion of carboxyl groups to hydroxyl groups in the resulting polyol mixture is of the order of about 1:2 to about 1:8 it is found that conventional one shot or prepolymer foaming techniques can be employed. In addition to the above considerations as to the ratio of COOH/OH groups in the polyol mixture it is advantageous to so choose the components of said mixture that the viscosity of the latter is of the order of 70,000 to 110,000 cps. at 25° C. In accordance with conventional one-shot techniques the polyol mixture and the isocyanate component are brought together in the presence of a catalyst and a blowing agent substantially simultaneously either by handmixing or in any of the conventional foam producing machines employed in the art. Alternatively a prepolymer or quasi prepolymer method can be employed. In such procedures the isocyanate is reacted with a portion of the polyol mixture in a preliminary step to give an isocyanate terminated prepolymer which is subsequently reacted with water and additional blowing agent, if desired in the presence of a catalyst, to produce the desired foam.

Any of the catalysts conventionally employed in the art to catalyze the reaction of a polyol and an isocyanate can be employed as catalysts in the above foam producing reactions in which the proportion of half-ester (I) in the polyol component is below the stated limit. Such catalysts are described, for example, by Saunders et al., Polyurethanes, Chemistry and Technology, part I, pages 228–232, Interscience Publishers, New York, 1962, and by Britain et al., J. Applied Polymer Science, 4, 207–211, 1960. Such catalysts include organic and inorganic salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and organic amines. Representative organotin catalysts are stannous octoate, stannous oleate, dibutyltin dioctoate, dibutyltin laurate, and the like. Representative organic amine catalysts are pyridine, quinoline, aniline, o-anisidine, triethylamine, triethylenediamine, N,N,N',N'-tetramethylethylenediamine, N,N,N',N' - tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N'-diethylethanolamine, and the like. Combinations of two or more of the above catalysts can be employed if desired. A particularly preferred catalyst for use in the above process is aniline alone or in combination with an organotin catalyst preferably dibutyltin dilaurate.

The blowing agents which can be employed in the above foaming operation are those conventionally employed in the preparation of rigid polyurethane foams. Illustrative of said blowing agents are water (which generates carbon dioxide by reaction with isocyanate) and volatile solvents such as the lower molecular weight aliphatic hydrocarbons and highly halogenated lower-aliphatic hydrocarbons, for example, trichloromonofluoromethane, dichlorodifluoromethane, chlorotrifluoromethane, 1,1-dichloro-1-fluoroethane, 1-chloro-1,1-difluoro-2,2-dichloroethane, and 1,1,1-trifluoro-2-chloro-2-fluorobutane and the like. If desired a mixture of water and one or more of said volatile solvents can be used as blowing agent. As is well recognized in the art the final foam density of the foams produced by the process of the invention is a function of the amount of blowing agent used.

When the proportion of half-ester (I) employed in the polyol component, from which the foams of the invention are prepared, is such that the ratio of COOH to OH groups in the polyol component is greater than about 1:2 it is found that conventional foaming techniques employing blowing agents such as water and volatile solvents as described above, give generally unsatisfactory results. This is believed due to the difference in rate of reaction of COOH and OH groups with isocyanate and also to the tendency of conventionally employed catalysts to catalyze the OH/NCO reaction at the expense of the COOH/NCO reaction. Where the half-ester (I) is employed as the sole polyol component or is employed in admixture with conventional polyols in such proportions that the COOH/OH ratio in the polyol mixture is higher than the limit set forth above, it has been found that the following technique gives satisfactory rigid polyurethane foams having the desired high temperature resistant properties in addition to the other properties such as strength, insulating capacity, density and the like normally required of a rigid polyurethane foam.

In accordance with this foam producing technique the polyol component and the polyisocyanate are mixed, either manually or mechanically, in the presence of small amounts of water, if desired, but in the absence of any catalyst, and the resulting mixture, if desired after placing in a suitable mold is then heated at a temperature within the range of about 100° C. to about 150° C. until desired foaming reaction is complete. Generally speaking the heating time necessary to effect the desired foaming is within the range of about 0.5 hr. to about 2 hrs. but longer or shorter times may be found necessary in particular cases.

Whichever foaming technique is employed in the preparation of the rigid foams of the invention the overall ratio of active hydrogen atoms (including those present in OH and COOH groups) to NCO groups in the foam reactants is advantageously within the range of about 0.9 to about 1.50 and preferably within the range of about 1.10 to about 1.20.

In order to produce rigid polyurethane foams having high temperature resistant properties, as hereinbefore defined in accordance with the present invention it has been found advantageous to employ an amount of half-ester (I) corresponding to at least about 20 percent by weight of the total polyol component. Preferably the amount of half-ester (I) employed in making the rigid foams of the invention corresponds to at least about 30 percent by weight of the total polyol component. The precise minimum amount of half-ester (I) which has to be present in the polyol component in order to obtain a rigid foam having the desired high temperature resistant properties varies according to the nature of the particular half-ester involved and will be greater in some cases than in others.

The above limits represent broad limits offered for the guidance of those skilled in the art. For any particular half-ester (I) the minimum concentration required to give the desired properties can be determined by a process of trial and error.

In a particular aspect of this invention it has been found that the high temperature resistant properties of the rigid foams of the invention can be enhanced still further by subjecting the polymethylene polyphenyl polyisocyanate to preliminary reaction with a minor proportion of a polycarboxylic acid intramolecular anhydride prior to the foaming reaction. Any of the polycarboxylic acid intramolecular anhydrides defined and exemplified above can be employed for this purpose, but preferably there are used aromatic intramolecular anhydrides i.e. those anhydrides in which the carboxylic acid groups from which each anhydride moiety is derived are present in an aromatic ring in ortho position with respect to each other. A preferred species for use in modifying the isocyanate in the above manner is trimellitic anhydride.

Advantageously the reaction between the polymethylene polyphenyl polyisocyanate and the polycarboxylic acid intramolecular anhydride is carried out by mixing the components at room temperature (circa 25° C.) and then heating the resulting mixture at a temperature of about 80° C. to about 120° C. until evolution of carbon dioxide ceases. The resulting product is then cooled, or allowed to cool, to room temperature prior to use in the preparation of foams in accordance with the processes hereinbefore described.

The amount of polycarboxylic acid intramolecular anhydride employed in the preparation of the modified isocyanate is advantageously less than about 0.5 equivalent of anhydride (the equivalent weight being calculated as the molecular weight of anhydride divided by the number of anhydride moieties per molecule) per equivalent of polymethylene polyphenyl isocyanate. Preferably the amount of polycarboxylic acid intramolecular anhydride employed is of the order of about 0.05 to about 0.2 equivalent per equivalent of polymethylene polyphenyl isocyanate.

The polymethylene polyphenyl isocyanate, after modification by reaction with an intromolecular anhydride, can be employed in the preparation of rigid foams in accordance with the invention in exactly the same manner as is described above for the use of unmodified polymethylene polyphenyl isocyanate.

When the half esters (I) of the invention are employed in admixture with conventional polyols for the preparation of the rigid polyurethane foams of the invention said mixture of polyols can be prepared by simple admixture of the components. Alternatively when the conventional polyol used to prepare the mixture is the same as the polyol used to prepare the half-ester (I), the mixture can be prepared in a convenient manner by employing an excess of polyol in the preparation of the half ester (I) as described above. There is thereby produced the desired mixture of half ester (I) and unreacted polyol. The proportions of the components of the mixture can be adjusted in any desired manner by employing the appropriate excess of polyol in the formation of the half ester (I).

As previously discussed, the rigid polyurethane foams of this invention possess markedly superior high temperature resistance when compared with rigid polyurethane foams hitherto known, for example, those prepared from polymethylene polyphenyl isocyanates under similar conditions but using polyols other than the half-esters (I). In addition to the improved high temperature resistance the rigid polyurethane foams produced in accordance with this invention possess all the desirable properties characteristic of rigid polyurethane foams prepared from polymethylene polyphenyl isocyanates; see, for example, Canadian Patent 700,026. Accordingly, the rigid polyurethane foams of the invention can be employed for all the purposes for which such foams are conventionally employed. For example, the rigid polyurethane foams of the invention can be employed as thermal barriers in the construction of fire walls in the building industry and as insulating materials in the preparation of refrigerators, refrigerated truck trailers, cold storage rooms, insulation of pipe lines and the like.

The following examples describe the manner and process of making and using the invention and set forth the best mode contemplated by the inventors of carrying out the invention but are not to be construed as limiting.

Example 1.—Half ester of dipropylene glycol and trimellitic acid

A mixture of 134 g. (1 mole) of dipropylene glycol and 192 g. (1 equivalent) of trimellitic anhydride was stirred and heated gradually until the temperature of the reaction mixture reached 170 to 180° C. At this temperature the reaction mixture became homogeneous and was allowed to cool to room temperature (25° C.) There was thus obtained the half ester of dipropylene glycol and trimellitic acid in the form of a solid having an equivalent weight of 108.3.

Example 2.—Di(half ester) of 3,3',4,4'-benzophenone tetracarboxylic acid dianhydride and a phosphoric acid-propylene oxide adduct A mixture of 80.5 g. (0.5 equivalents) of 3,3',4,4'-benzophenone tetracarboxylic acid dianhydride and 231 g. (1.5 equivalents) of the adduct of 1 mole of 105% phosphoric acid and 5.8 moles of propylene oxide was heated slowly with stirring until the temperature of the mixture reached 170° to 180° C. At this temperature the mixture became homogeneous and was allowed to cool to room temperature. There was obtained a mixed polyol comprising (a) the di(half ester) of 3,3',4,4'-benzophenone tetracarboxylic acid and the adduct of 1 mole of 105% phosphoric acid and 5.8 moles of propylene oxide and (b) unreacted phosphoric acid-propylene oxide adduct. Said mixture of polyols was a liquid having an equivalent weight of 155, a phosphorus content of 5.54% by weight, a viscosity of 300,000 cps. at 25° C. and a functionality of 5.2.

Example 3.—Half ester of polypropylene glycol and trimellitic acid

A mixture of 425 g. (1 mole) of PPG-425 (a polypropylene glycol of hydroxyl number 265) and 192 g. (1 equivalent) of trimellitic anhydride was stirred and heated gradually to 170 to 180° C. When the mixture became homogeneous at the latter temperature the product was cooled to room temperature. There was thus obtained the half ester of polypropylene glycol and trimellitic acid in the form of a viscous liquid having an equivalent weight of 209.

Similarly using the above procedure but replacing PPG-425 by an equivalent amount of PPG-1025 (a polypropylene glycol of hydroxyl number 110) there was obtained the corresponding half ester of this polypropylene glycol and trimellitic acid in the form of a viscous liquid having an equivalent weight of 414.

Similarly the following half ester polyols were prepared using the molar proportions set forth below and heating the mixture of reactant slowly with stirring to 170° to 200° C. until a homogeneous solution was obtained. At this point the reaction mixture was cooled to room temperature (circa 25° C.). The equivalent weights of the polyols so prepared are shown.

TABLE I

Reactants and proportions:

| | Equivalent wt. of half-ester |
|---|---|
| (a) 2 moles of the reaction product of 1 mole of trimethylolpropane and 3 moles of ethylene oxide (eq. wt. 91.2); 1 mole trimellitic anhydride | 104 |
| (b) 2 moles of the reaction product of 1 mole of trimethylolpropane and 3 moles of ethylene oxide (eq. wt. 91.2); 1 mole pyromellitic dianhydride | 95 |
| (c) 2 moles of the adduct of 1 mole glycerol and 3 moles of propylene oxide (eq. wt. 89); 1 mole trimellitic anhydride | 104 |
| (d) 2 moles of the adduct of 1 mole of glycerol and 3 moles of propylene oxide (eq. wt. 89); 3 moles triethanolamine; 1 mole trimellitic anhydride | 79.8 |
| (e) 1 mole of the adduct of 1 mole of glycerol and 3 moles propylene oxide (eq. wt. 89); 1 mole diethanolamine; 1 mole phthalic anhydride | 84.4 |
| (f) 1 mole of diethylphosphite; 1 mole of the adduct of 1 mole of glycerol and 3 moles propylene oxide (eq. wt. 89); 1 mole phthalic anhydride | 138.2 |
| (g) 1 mole dipropylene glycol; 1 mole PPG-425; 1 mole trimellitic anhydride | 159 |
| (h) 1 mole diethylphosphite; 1 mole trimellitic anhydride | 165 |
| (i) 1 mole diethyl bis(2-hydroxyethyl)-amino methanephosphonate; 1 mole trimellitic anhydride | 144.5 |
| (j) 3 moles of the adduct of 1 mole of glycerol and 3 moles propylene oxide (eq. wt. 89); 1 mole 3,3',4,4'-benzophenone tetracarboxylic dianhydride | 101.5 |

Example 4

Using the procedure described in Example 3 but replacing PPG-425 by a molecular equivalent proportion of a polyol of equivalent weight 133 (a blend of (i) an adduct of propylene oxide and a methylene-bridged polyphenyl polyamine mixture obtained by acid condensation of aniline and formaldehyde and (ii) a glycerol-propylene oxide adduct) there is obtained the corresponding half ester of trimellitic anhydride.

Example 5

Using the procedure described in Example 1 but replacing trimellitic anhydride by the corresponding equivalent amount of bis(3,4-dicarboxyphenyl)sulfone dianhydride there is obtained the bis(half ester) of dipropylene glycol and bis(3,4-dicarboxyphenyl)sulfone.

Similarly using the procedure described in Example 1, but replacing trimellitic anhydride by an equivalent proportion of benzene-1,2,3,4-tetracarboxylic dianhydride, tertrahydrophthalic anhydride, tetrabromophthalic anhydride, diphenyl-3,3',4,4' - tetracarboxylic dianhydride, naphthalene - 1,2,5,6-tetracarboxylic dianhydride, 2,6-dichloronaphthalene - 1,4,5,8-tetracarboxylic dianhydride, 2,3,6,7, - tetrachloronaphenalene - 1,4,5,8 - tetracarboxylic dianhydride, bis(2,3-dicarboxyphenyl)methane dianhydride, 1,1 - bis(3,4 - dicarboxyphenyl)ethane dianhydride, bis(3,4-dicarboxyphenyl)ether dianhydride, cyclopentane-1,2,3,4-tetracarboxylic dianhydride, pyrrolidine-2,3,5,6-tetracarboxylic dianhydride, or butane-1,2,3,4-tetracarboxylic dianhydride, there are obtained the corresponding half esters with dipropylene glycol.

Example 6

Using the procedure described in Example 1, but replacing dipropylene glycol by an equivalent proportion of PG-435DM a polyoxypropylene polyether polyol based on methyl glucoside; hydroxyl number 435±5, N,N,N',N'-tetrakis(2 - hydroxypropyl)ethylenediamine, TP-740 (a trimethylolpropane-propylene oxide adduct; eq. wt. 244; N,N-di(2-hydroxypropyl)aniline, polyethylene adipate, or polypropylene adipate there are obtained the corresponding half esters with trimellitic acid.

Similarly using the procedures described in Examples 1 to 6 above and reacting at least 1 mole of a polyol having an equivalent weight of about 70 to about 200 and an average functionality of from about 2 to about 8, with the appropriate polycarboxylic acid intramolecular anhydride there is obtained the corresponding half ester of the invention.

Example 7

A rigid polyurethane foam (foam A) was prepared in the following manner:

The isocyanate employed in the preparation of the foam A was prepared as follows:

A mixture of 1190 g. of PAPI® (9 equivalents; a polymethylene polyphenyl isocyanate equivalent wt. 133; viscosity approx. 300 cps. at 25° C.) and 192 g. (1 mole) of trimellitic anhydride was heated at 110 to 115° C. with stirring under reduced pressure until further evolution of carbon dioxide ceased. The resulting product was allowed to cool to room temperature (25° C.). It was a brown liquid having an isocyanate equivalent of 153 and a viscosity of approximately 20,000 cps. at 50° C.

A total of 202 parts by weight of the latter product was added rapidly with stirring to a preformed mixture of 70 parts by weight of the half ester of Example 2 above, 30 parts by weight of an adduct (equiv. wt. 89) of 1 mole of glycerol and 3 moles of propylene oxide, 2 parts by weight of L-5320 (liquid organo silicone surfactant), 3.6 parts by weight of water, 2 parts by weight of aniline, and 0.5 part by weight of dibutyltin dilaurate. The resulting mixture was poured as quickly as possible into a 7" x 7" x 12" mould and allowed to foam freely. The resulting foam (A) was allowed to cure at 25° C. for 7 days and was then found to have the physical properties shown in Table II below.

For comparison a foam (foam B) was prepared from a conventional prior art polyol in the following manner.

A mixture of 100 parts by weight of HLR-320 (a polyester polyol of equivalent weight 150 based on chlorendic anhydride, 2.0 parts by weight of DC-201 (a water-soluble silicone-glycol copolymer cell control agent and foam stabilizer), 0.5 part by weight of triethylamine, 0.5 part by weight of N,N,N',N'-tetramethylbutane-1,3-diamine, and 30 parts by weight of Freon 11-B (trichlorofluoromethane) was prepared by mechanical mixing. To the mixture was added 97 parts by weight of PAPI® with vigorous stirring and the resulting mixture was poured as quickly as possible into a 7" x 7" x 12" mould and allowed to foam freely. The resulting foam (B) was allowed to cure at 25° C. for 7 days and was then found to have the physical properties shown in Table II below.

All the properties shown in the Table II were determined using the procedures outlined in the manual of "Physical Test Procedures" of The Atlas Chemical Industries, Inc. unless otherwise stated:

TABLE II.—PHYSICAL PROPERTIES OF FOAMS A AND B

| | Foam A | Foam B |
|---|---|---|
| Percent phosphorus in foam | 12.25 | 0.78 |
| Percent chlorine | | 8.65 |
| NCO/active H ratio | 1.10 | 1.10 |
| Density, lbs./cu. ft | 2.12 | 2.02 |
| Compression // to rise (p.s.i.) | 28.2 | 39.7 |
| Ratio of strength to density | 13.6 | 19.6 |
| Percent change of volume at 158° F., 100% R.H.: | | |
| 24 hrs | 1.3 | 5.5 |
| 3 days | 0.8 | 6.3 |
| Percent change of volume at 200° F., dry heat: | | |
| 24 hours | −0.8 | 2.7 |
| 3 days | −0.7 | 3.3 |
| Percent weight loss at 550° F., dry heat, 2 hours | 27.3 | 84.0 |
| Flame test (ASTM-1692-59T): | | |
| Average distance burned (inches) | ⁹⁄₁₆ | ⁹⁄₁₆ |
| Rating | (¹) | (¹) |

¹ Non-burning.

From the above results it will be seen that the rigid foam A produced in accordance with the invention exhibited markedly superior resistance to both humid and dry aging and markedly lower loss on heating to 550° F. as compared with foam B prepared in accordance with the prior art.

Using the procedure described above for the preparation of foam A but replacing the half ester of Example 2 above by any of the half esters prepared as described in Examples 1 and 3 to 6, there are obtained high temperature resistant foams in accordance with the invention.

Example 8

A rigid polyurethane foam was prepared in accordance with the invention in the following manner:

The following ingredients were mixed mechanically:

| | G. |
|---|---|
| Half ester shown as (C) in Example 3, Table I | 100 |
| DC-201 | 2 |
| Water | 0.9 |
| PAPI® | 85 |

The mixture so obtained was placed in a circular mould and maintained at 145° C. in an oven for 2 hours. The resulting foam had a density of 2.5 p.c.f. and had a fine, uniform cell structure. A specimen of the foam was exposed to the flame of a propane torch and thereupon yielded a very fine, rigid cellular char with no evidence of melting or deformation.

Example 9

Using the procedure described in Example 7 for the preparation of foam A, but replacing the 202 parts of the reaction product of PAPI® and trimellitic anhydride by 175 parts by weight of PAPI®, there was obtained a high temperature resistant foam having properties comparable to those of foam A of Example 7.

We claim:

1. A high temperature resistant rigid polyurethane foam which comprises the product of reaction under foam producing conditions of:
   (a) a polyol which comprises the half ester obtained by reacting at about 150 to about 250° C. a polycarboxylic acid intramolecular anhydride and a polyol having an equivalent weight of about 70 to about 200 and an average functionality of from about 2 to about 8 until the equivalent weight of the reaction product corresponds to that of the desired half ester, the esterifying polyol being used in a proportion of approximately 1 mole per anhydride moiety in the polycarboxylic acid intramolecular anhydride; and
   (b) a polyisocyanate which comprises a mixture of polymethylene polyphenyl isocyanates containing from about 40 to about 65 percent by weight of methylenebis(phenyl isocyanates) the remainder of said mixture being polymethylene polyphenyl isocyanates having a functionality higher than 2.0.

2. A polyurethane foam according to claim 1 wherein the mixture of polymethylene polyphenyl isocyanates has been pretreated by reaction with a polycarboxylic acid intramolecular anhydride in the proportion of about 0.05 to about 0.2 equivalent of anhydride per equivalent of isocyanate.

3. A polyurethane foam according to claim 2 wherein the mixture of polymethylene polyphenyl isocyanates has been pretreated by reaction with trimellitic anhydride in the proportion of about 0.05 to about 0.2 equivalent of anhydride per equivalent of isocyanate.

4. A polyurethane foam according to claim 1 wherein the polycarboxylic acid intramolecular anhydride employed in the preparation of the half ester is an aromatic polycarboxylic acid intramolecular anhydride selected from the group consisting of anhydrides having the following formulae:

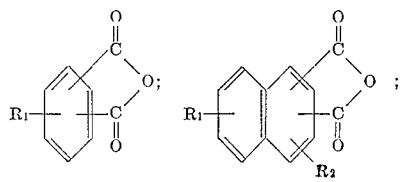

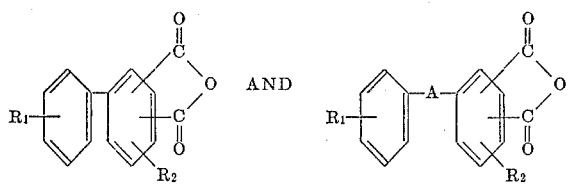

wherein $R_1$ and $R_2$ each represent from 0 to 3 substituents selected from the class consisting of carboxyl, halogen, lower-alkyl, and the group

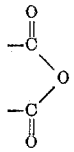

wherein the carbon atoms of the latter are each attached to adjacent carbon atoms in an aromatic ring, and A is a bridging group selected from the class consisting of alkylene, carbonyl, sulfonyl, and oxygen.

5. A polyurethane foam according to claim 4 wherein the aromatic polycarboxylic acid intramolecular anhydride is trimellitic anhydride.

6. A polyurethane foam according to claim 1 wherein the polyol component (a) comprises, in addition to the half ester, a polyol having an equivalent weight of about 70 to about 200 and an average functionality of from about 2 to about 8 said polyol and said half ester being used in proportions such that the ratio of COOH/OH groups in the resulting mixture is within the range of about 1:2 to about 1:8.

References Cited

UNITED STATES PATENTS

| | | | |
|---|---|---|---|
| 3,156,659 | 11/1964 | Robitchek | 260—2.5 |
| 3,297,606 | 1/1967 | Dunkel | 260—22 |
| 3,300,420 | 1/1967 | Frey | 260—2.5 |

JAMES A. SEIDLECK, *Primary Examiner.*

M. B. FEIN, *Assistant Examiner.*

U.S. Cl. X.R.

260—475, 469